Dec. 14, 1937.  O. L. CLEVEN  2,102,577

VERIFYING MACHINE

Filed July 20, 1937  4 Sheets-Sheet 1

INVENTOR
O. L. CLEVEN
By J. F. Motherhead
ATTORNEY

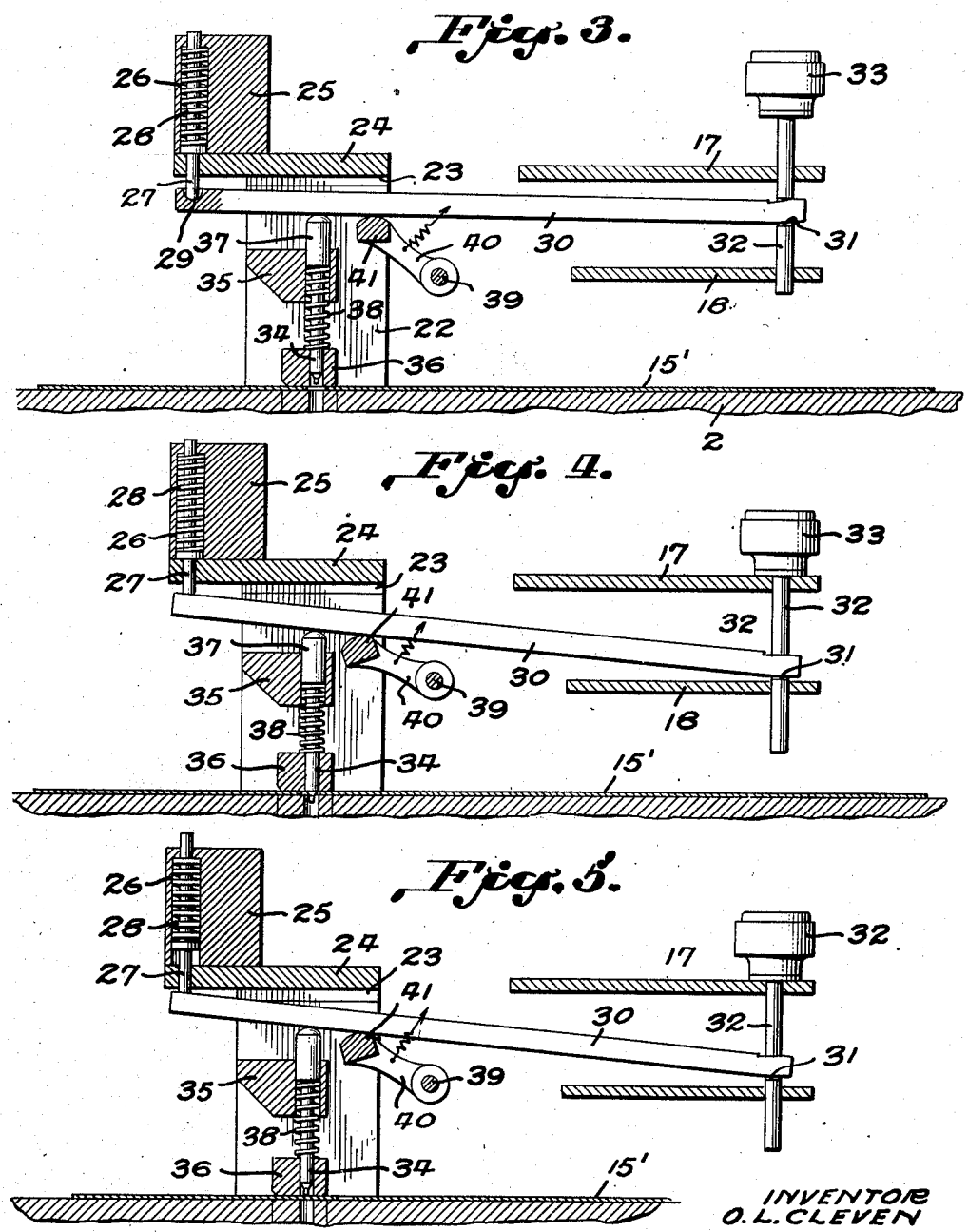

Dec. 14, 1937.  O. L. CLEVEN  2,102,577
VERIFYING MACHINE
Filed July 20, 1937  4 Sheets-Sheet 3

INVENTOR
O. L. CLEVEN
By J. F. Mothershead
ATTORNEY

Dec. 14, 1937.  O. L. CLEVEN  2,102,577
VERIFYING MACHINE
Filed July 20, 1937  4 Sheets-Sheet 4
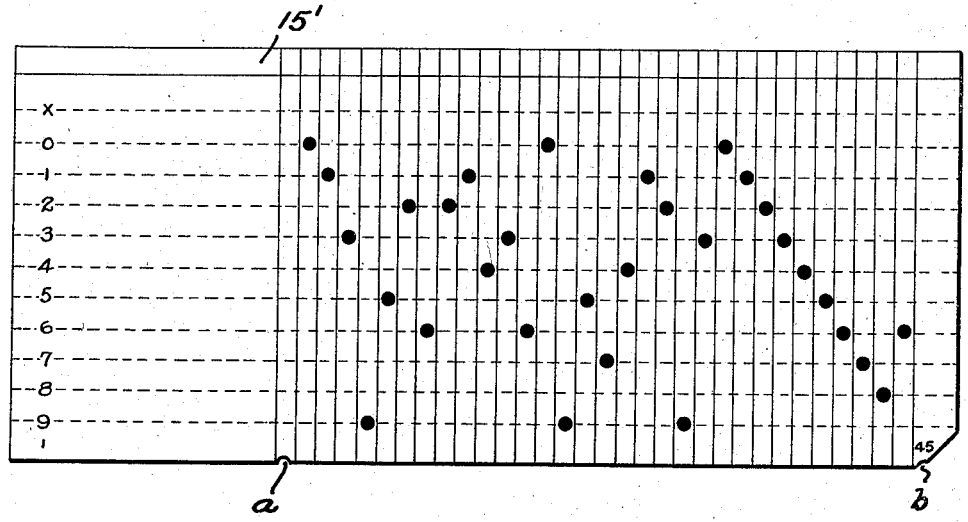
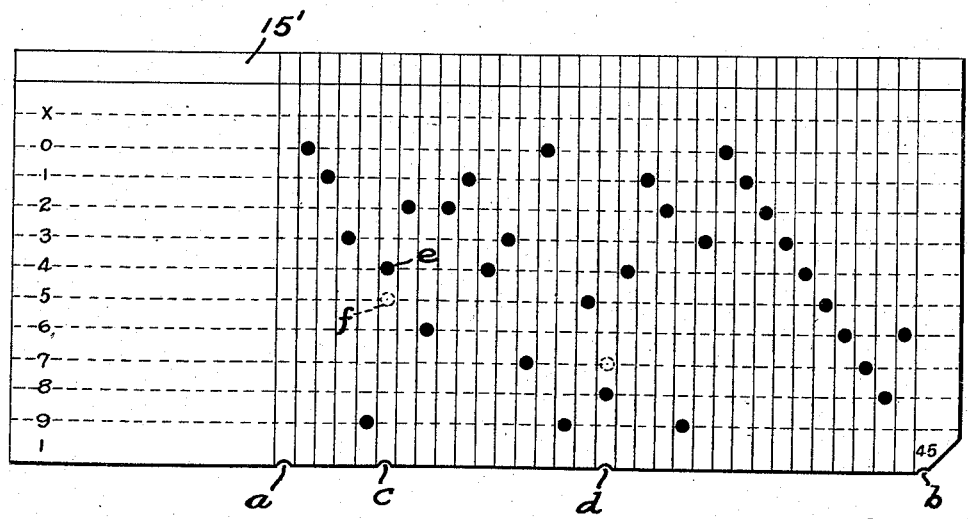
INVENTOR
O. L. CLEVEN
By J. F. Motherhead
ATTORNEY Patented Dec. 14, 1937

2,102,577

UNITED STATES PATENT OFFICE 2,102,577

VERIFYING MACHINE

Oluf L. Cleven, Washington, D. C.

Application July 20, 1937, Serial No. 154,527

8 Claims. (Cl. 73—51)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to verifying machines, and more particularly to machines of this character commonly used in statistical work wherein a card or perforated record is employed to record, in the form of punched holes, data taken from elsewhere.

I am aware that it is not new to check up on errors made in the punching of records by running them through verifying machines to show whether or not the card has been correctly punched, but some of these machines have been complicated and especially those using electric circuits, and a number of keys, other than the analyzing keys, having various functions necessary in the operation of the machine, most of which I eliminate, retaining only the analyzing or sensing keys of former disclosures, and adding a manually and mechanically operated "detector key", that physically and directly marks the card, and simultaneously operates the escapement to permit the card carrier to move the distance of one card column. I am aware further that it has been suggested that holes of a shape different from that made by a punching machine punch, be punched in the card in the verifying process, or that some mark be placed upon the card in such process, intended to locate the error in the punched card,—but these do not accomplish the purposes of my invention and do no more than indicate by the presence of the anomalous hole or mark, that an error has occurred. In these machines the same old inconveniences and difficulties remain, and it is impossible with such machines to check the error from the very first verifying operation to and through the final storing of the verified cards in their box or other containers.

Among the objects of this invention, are to simplify the machine; make its operation entirely mechanical, meaning that it is divorced entirely from any electrical control with the obvious resulting disadvantages; to make it necessary for the operator to mark the card at the beginning of the verification area or field before further verification can proceed, to mark the card at a place that the mark will show when the cards are bunched or in their final packing case, and obviate the necessity of "needling" the bunched cards, and making the marking means entirely independent of the analyzing or sensing means and in no way controlled one by the other.

Other objects and advantages of the invention will appear from the following description, and it is to be understood that I do not limit myself to the precise construction shown, as for instance an important feature of the invention is that that enables the card to be marked on its edge, so that the mark is visible in all positions of the card as intimated, and while the most convenient and expeditious way, as I now view it, is to punch out a mark in the form of a notch on the card edge, the edge may be marked by a short inked area at the top or bottom, preferably the bottom, as obviously this sort of a mark would also be visible in all out of the machine positions, bunched or otherwise, after verification.

In census work for instance, verifying machines are commonly used and the data taken from schedules made by the census enumerator is transferred to the card by a punching machine. These cards are, after having been punched, turned over to "verifiers" who, with the same schedule before them, place the cards in a verifying machine, one by one, and run them for a check up upon any mistake made by the punching machine operator, such for instance as where the card is punched for "female" when it should have been punched for "male". Notwithstanding this error the verifying machine operator can pass the card on as properly verified and there is no convenient or expeditious way of detecting the error. In my improved machine, should the error above mentioned occur, the key for that designation on the verifying machine will fail to sense a hole, and encountering a solid part of the card instead, will not have been suppressed sufficiently to actuate the escapement mechanism and consequently the card carrier will not be advanced, indicating an error at that point. It is now necessary to depress an extra key that I provide and in so doing, not only advance the card carrier a step, but incidentally and simultaneously notch or mark the edge of the card at the foot of the column in which the error occurred. The practice is to place the "verified cards" long edge up, in boxes of a width corresponding to the length of the card, and there is, in such arrangement in the past, no visible sign or indication that the cards have been correctly verified, or indeed whether they or any part of them have been verified at all. Operators, impelled by various impulses, as for instance a desire to make a record for fast work, sometimes may take bodily a bunch of cards and a corresponding number of schedules from which they are supposed to verify the card data, and place such cards in the "verified" box and the schedules elsewhere,—without attempting to verify them at all. Then, too, an operator will sometimes make a mistake and know that such a mistake has been made, and attempt to cover it up by certain possible manipulations of the machine in common use, and still there will be no visible sign in the box of cards to show the deceit.

It is my purpose to provide a mechanism that will make it impossible in some instances, and so very inconvenient in others, that a verifying machine operator cannot or will not resort to any of the subterfuges above indicated, this being an arrangement that will make it necessary to punch and mark a card with the mark visible at the edge of the card, which mark is placed there before the verification field of the card is moved toward the sensing or analyzing devices of the machine at the beginning of the verifying operation, and another mark placed upon the edge of the card at the end of the verifying operation. This mark, which is preferably a notch in the shape of a half moon, or it may be of some other shape,—or it may be in some other form, so long as it is visible on the edge of the card, is produced by an extra key forming part of my invention and which is depressed by the operator as the first thing done and the placing of the notch at the bottom of the final column of the card, is the last.

The notch or mark made in the card edge at the beginning of the actual verifying operation is the important one. A card is placed in the carriage at the entry end of the machine and by hand the carriage is moved to verifying position at the other end from which the card cannot be bodily removed and from which latter position it must be moved with a step-by-step movement back to the entry end, but my arrangement precludes such movement until a "detector key" is depressed, which marks the card at the first column in the verification field. Under these circumstances there can be no incentive on the part of the operator to remove the card at this stage, as now the easiest thing to do is to continue the verification to the end, and while it is desirable that a mark be placed at the end of the verification field, it is not essential, for as intimated the card cannot be removed, except from the entry end of the machine, and to get it back to this point, without the verification of its entire field, would necessitate that the detector key be successively depressed, and since each depression places a mark on the card edge, which would now appear in sawtooth form, there would at once be indicated an obvious unusual condition that the operator naturally seeks to avoid.

Sometimes there will be more than one error in the punching of the card, and in such case it will be necessary to depress the extra key for each error in order to move the card and for each operation of the "detector key" there will be a notch cut in the card, and this notch will be at the foot of the column wherein the error occurred. When an error is detected it is the duty of the operator to mark the place that should have been punched, and put the card aside for repunching, but sometimes for an unworthy reason or by oversight, this is not done. However, with my arrangement of the machine the error cannot go far without detection, for when the cards are stacked in the box notches will be readily visible and the wrongly punched card or cards will be separated from the rest and repunched correctly.

From the foregoing it has already probably become obvious to those familiar with this work that all of the properly verified cards, as they should finally appear in their packing box, should show only two grooves, one at the beginning of the verification field of the card and the other at the end, extending entirely across the batch, and made by the registering half-moon or otherwise shaped notches.

In the drawings illustrating the invention only so much of a standard verifying machine is shown that is necessary to show the application thereto of my invention. These machines include an escapement mechanism of the same general character as the similar mechanism controlling the movement of a typewriter carriage, wherein upon the depression of a key the carriage moves with a step-by-step movement, there being in the verifying machine, as in the typewriter, suitable and adjustable stops to limit the extent of card carrier movement, as the exigencies of the case may require.

In the drawings—

Figure 1 is a plan view of a verifying machine showing some of my improvements applied thereto, and showing a punched card on the bed-plate in the position it occupies when placed in the position it occupies when placed in the machine, and before moving it to the other end of the machine, from which end it moves back, with a step-by-step movement upon manipulation of the verifying keys to the position shown, and from which position, and that position only, it can be removed from the machine.

Figure 3 is a section about on line 3—3 of Figure 1 showing certain of the parts of the usual machine in normal position or in a position where the sensing finger is in position to sense a hole in the card.

Figure 4 is a similar view showing the position of the parts at the time a hole is sensed.

Figure 5 is a view like 3 and 4 showing the positions of the parts when the sensing finger is stopped in its downward movement by contact with a solid part of the card, or a "no-hole" part.

Figure 10 is a plan of a card that has been "verified" correctly and shown to be so, by the absence of notches intermediate of the two notches at the beginning and end of the verification area.

Figure 11 is a similar view showing notches indicating that two errors have been developed in the verification process.

Figure 1:
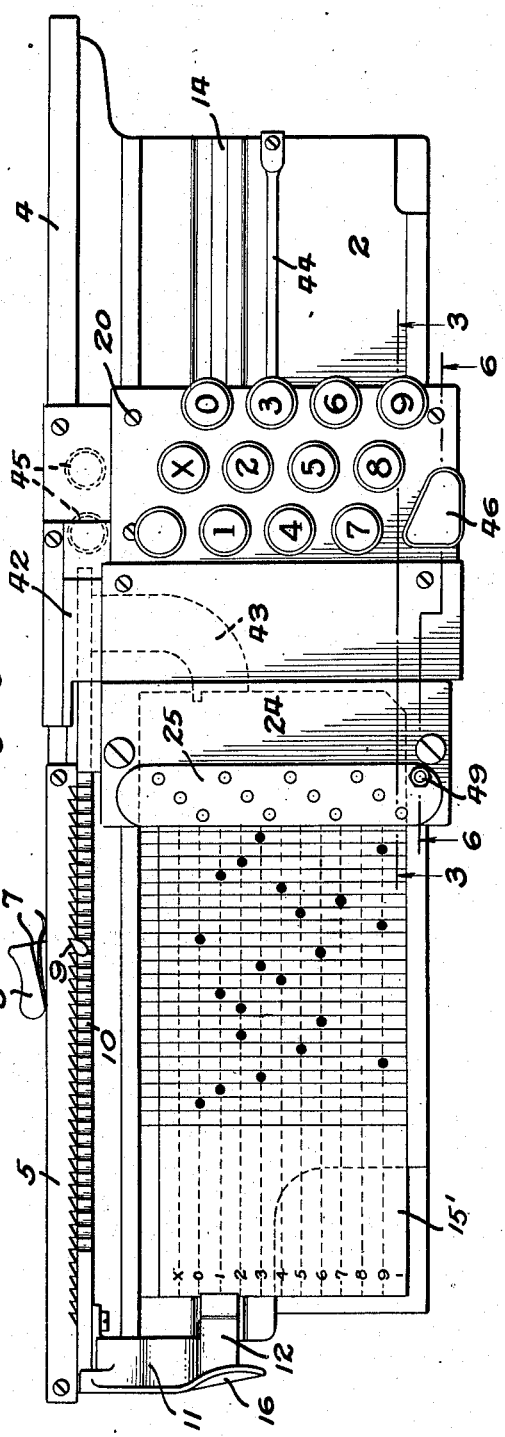

In the drawings, the numeral 1 designates the base of the machine, generally rectangular in shape and long enough to accommodate a card in two extreme positions, on the bed plate 2, with which the machine is provided. On one side of the machine, and on the inner face of a short upstanding plate 4, is the stationary stop rack 5, provided with a long slot 6 through which extends the flattened portion 7 of a manually operated pawl 8, whose rear end 9 is shaped to enter one or another of the notches on the rack, as clearly shown in Figures 1 and 2.

The numeral 10 designates the movable escapement rack to whose outer end is attached a member 11 formed with an inwardly extending flat arm 12, whose inner end is bent down as indicated at 13, and runs in a groove 14, running the entire length of the bed plate, the arm being provided with a lateral notch 15 that receives the end edge of the card 15' as it is placed in the machine. The member 11 is further provided with a finger piece 16, which with the escapement rack and the parts carried by it, may be conveniently moved to any position possible on the machine.

Toward the right hand side of the machine there are two spaced plates 17 and 18 mounted upon two posts 19 at one end, while the bottom plate 18 is extended beyond the plate 17, where it is secured to the upper edge of the side plate 4, there being two additional posts 20, that extend between the plates 17 and 18.

Suitably secured to opposite sides of the machine, are two standards 21 and 22, whose upper ends are inturned as indicated at 23 to make a better rest for a plate 24 extending across the machine, (Figs. 3, 4 and 5) and forming a support for the housing 25. The housing is bored as indicated at 26 for the passage of the various fulcrum pins 27, and the springs 28, by which the pins are backed. The ends of the pins extend below the plate 24 and the end of each pin is received in a socket 29, at the end of each of a series of operating levers 30, whose opposite ends are bifurcated and straddled a reduced portion 31, of the stems 32 of the operating keys 33, of which there are, in the machine illustrated, twelve. The keys, as shown, are mounted in the plates 17 and 18 and their downward movement is limited by the upper plate.

To one side, and below the housing 25, the sensing fingers 34 are located in upper and lower cross bars 35 and 36, respectively. Each finger is provided with a head 37, between the shoulder of which and the lower cross bar or die 36, is a spring 38, tending to keep the finger raised.

Extending across the machine, adjacent the sensing fingers and below the operating levers, of which it will be understood there is one for each key, is a shaft 39 upon which there are fixedly mounted spring raised bail arms 40, one on each side of the machine, spanned by a bail 41 contacting with the undersides of all of the operating levers, so that when any lever is operated by its key, the bail arm will be rocked and consequently the shaft 39. This shaft 39 at the rear of the machine extends into and forms part of the usual escapement mechanism (not shown) including appropriate pawls and springs, which are caused, by the rocking of the bail shaft, to engage or disengage the escapement rack to assure a step-by-step movement of the escapement rack. A clock action spring moves the escapement rack which is a part of the card carrier, the spring being automatically wound in returning the carrier to verification position.

Figure 2:
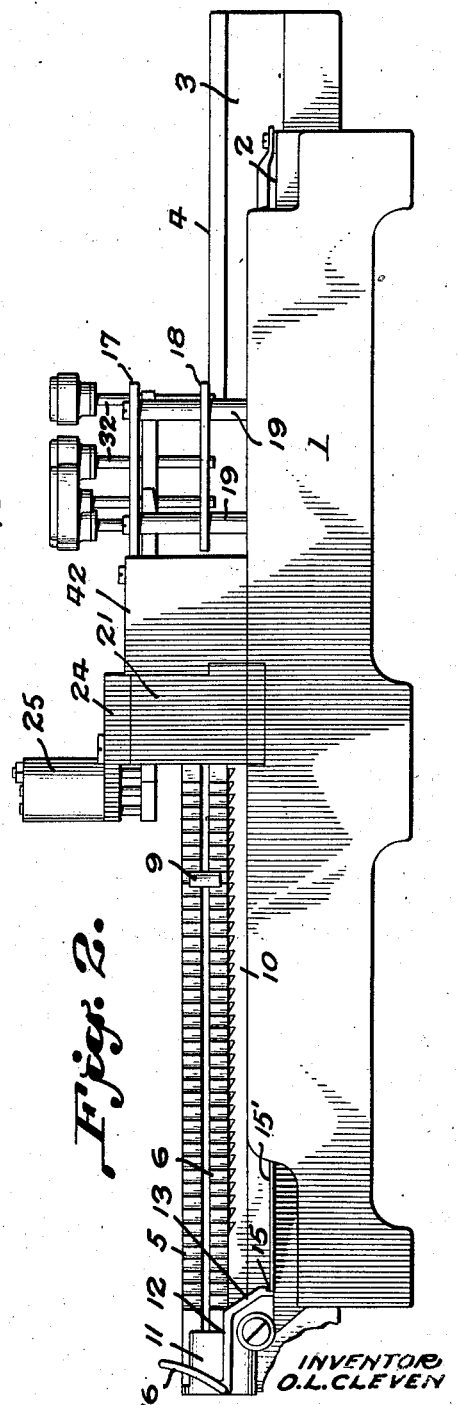
Figure 2 is a side elevation of the machine.
Figure 6:
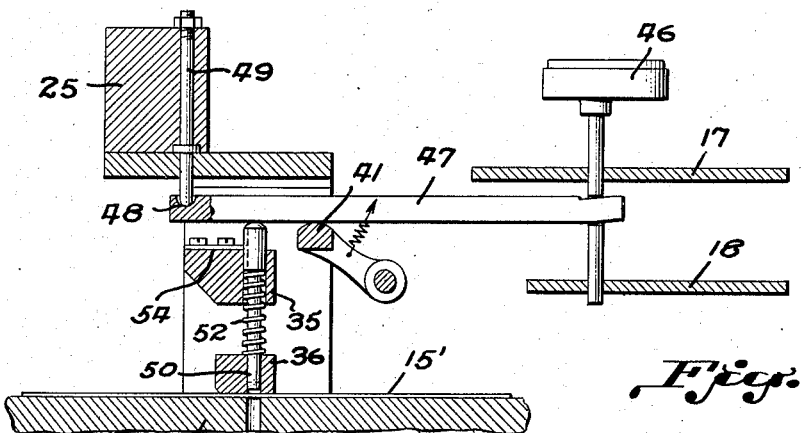
Figure 6 is a section taken about on line 6—6 of Figure 1 showing my attachment to the machine.

Heretofore the escapement mechanism on a standard machine, has been exposed to the operator and available for certain manipulations that can defeat the purposes of accurate verification of the cards. However, as shown in Figure 1, I provide a plate 42 covering the mechanism and rendering it accessible only with more difficulty than the operator cares to encounter.

Secured to the right hand end of the movable escapement rack 10 and extending inwardly to the center of the bed plate, is an abutment 43 (dotted lines Fig. 1) engaged by the inner end of the card when entering it in the machine in the position the card occupies in said figure.

Secured to the bed plate is a guard rod 44 raised sufficiently for the card to pass under its free end and extending sufficiently far under the key supporting plates, to prevent the removal of the card from this end of the machine.

So far, I have described a machine, no essential part of which, with the exception of the protecting plate 42, is of my contrivance.

Now, my additions, mainly illustrated in Figures 6, 7, 8, 9 and 12, will be described with special reference to these figures.

I have shown on Figure 1, in dotted lines and indicated by the numeral 45, two keys. This is done to show their location on the machine upon which I am improving. One key is to release the escapement rack and permit it to go for its full length of travel in a single movement, and the other to control the rack with a step-by-step movement. Both of these I eliminate and for them substitute a single "detector" key 46 by which the movement of the rack or its feed is confined to a step-by-step movement. This key is unlike the others in shape so as to be readily distinguished by the operator. Its stem, however, has a reduced portion like the other keys, which is straddled by the bifurcated end of an additional operating lever 47, somewhat shorter than the other levers, and its other end is provided with a socket 48 for the reception of the lower end of a stationary fulcrum pin 49 mounted in the housing 25. Mounted in cross-pieces 35 and 36, in the same manner as the sensing fingers 34, is a punch finger 50, kept elevated with its upper end 51 against the lever 47, by a spring 52, so that when the detector key 46 is depressed the lever will operate upon both the punch and the bail bar 41 and through the latter operate the usual escapement mechanism. The head 51 of the punch has a groove 53 into which extends the end of a spline 54, whereby the punch is prevented from turning in the bore in the piece 35. The lower end of the punch is rabbeted, as indicated at 54 for about half of its diameter, forming a shoulder 55. The edge of the card abuts against the flat portion of the rabbet, and the shoulder 55 overhangs the card edge so that when the detector key is depressed, a half moon notch is cut in the edge of the card, as shown in Figure 10.

In operation the operator places the card in the machine in the position shown in Figure 1; moves it toward the other end of the machine by moving the escapement rack which carries the card abutments 12 and 43, until the abutment 12 engages the stop 9 which will be at a point beyond which it is desired to verify it.

As intimated, before any movement of the card carrier and card takes place the detector key is pressed, notching the edge of the card. Thereafter, reading from the same schedule from which the card has been punched by the punch machine operator, the appropriate sensing finger operating keys will be depressed, and each sensing finger, if the card has been correctly punched, will go all the way down and find a hole, and the card holder will move one space, or to the next column on the card, and so on until the card is completely verified, when it can be removed from the machine from the same end into which it was inserted; but if the punching is wrong, then the particular sensing or analyzing finger will encounter the solid or "no-hole" portion of the card and will not go all the way down, the key will not be sufficiently depressed to operate the escapement mechanism, and consequently the card carrier will not move. The only way to move the carrier is by depressing the detector key which can move all the way down, and which simultaneously operates the escapement and punches a notch in the card, to be readily observed, and either immediately detected by the usual inspector or in any event when the cards are packed in their box.

As stated at the outset the card, in any event, whether correctly punched or not, must be passed entirely through the machine and this will be indicated primarily and essentially by the first notch $a$ and secondarily by the final notch $b$—Figures 10 and 11. In Figure 11, two errors have been developed, as indicated by notches $c$ and $d$, as for instance in the column of the notch $c$, the hole $e$ should have been punched where the hole is indicated by dotted lines $f$, likewise as to notch $d$.

Figure 12:
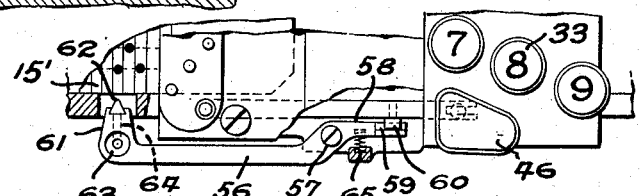
Figure 12 is a detailed fragmentary view showing modification wherein the operation of the detector key places a mark on the edge of the card in a color contrasting with said card.
Figure 7:
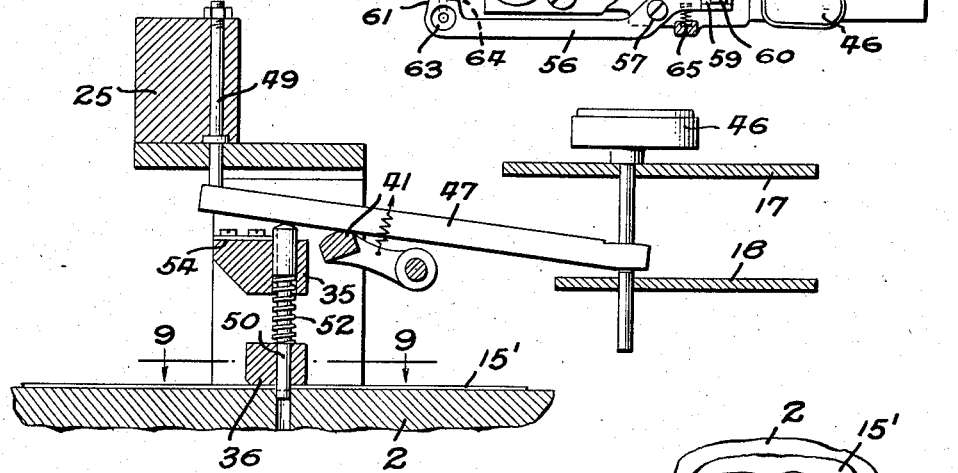
Figure 7 shows the position of the parts when my extra "detector" key is depressed and in position where it has punched or notched out a portion of the edge of a card.
Figure 9:
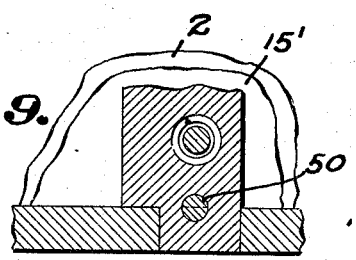
Figure 9 is a detail sectional plan taken about on line 9—9 of Figure 7.
Figure 8:
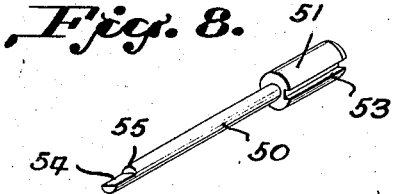
Figure 8 is a detail perspective view of the punch actuated by the detector key.

Referring now to Figure 12 which illustrates a modification of my invention there is shown a means for marking the edge of the card comprising an inking device arranged to mark the edge of the card with a small inked area. In this form the numeral 56 designates an arm pivoted at 57 to the frame of the machine, the arm being provided beyond its pivot with an arm 58 which carries a laterally extending inclined lug 59 arranged to be engaged by a similar lug 60 carried by the detector key lever. The arm 56 is bent inwardly as indicated at 61 and carries a small inking pad 62 which may be fed from an inkwell 63 through a short conduit 64. When the detector key is depressed the lug 60 carried by it engages the lug 59, both of which lugs are appropriately beveled and cause an outward movement of arm 58 against the pressure of spring 65 and consequently an inward movement of the pad carrying arms 56. When this occurs a small ink area is placed on the edge of the card.

In the arrangement shown in the drawings the marking of the card does not appear at the bottom of the column in which the error occurs but does appear in a column a predetermined distance from the error column, and consequently the operator understanding this, can quickly count to, and locate the error column. Say for instance the error occurred in column 23 on the card the ink mark would be say at the foot of column 19. This arrangement that contemplates the marking of the card in a column other than that in which the error occurs, is designed with relation to the construction of the machine shown in the main figures but obviously by rearrangement of the location of the sensing fingers and a modification of the machine frame, the ink marking may be made to appear in the same column with the error. Indeed the form shown in the main figures is decidedly to be preferred over the inking arrangement and this is shown more particularly for the purpose of illustrating a form which I consider falls within the scope and spirit of the invention.

I claim:

1. In a machine of the character described including an escapement mechanism and a card carrier whose movement is controlled with a step-by-step movement by said escapement mechanism, an analyzing means arranged to sense, by passage therethrough, perforations in a record, and permit the operation of the escapement mechanism only upon verification of said perforations, and marking means independent of the analyzing means and operable to simultaneously mark the card and cause a movement of the escapement mechanism when the analyzing means detects an error.

2. In a machine of the character described including an escapement mechanism and a card carrier whose movement is controlled with a step-by-step movement of said escapement mechanism, sensing means to operate the escapement mechanism only when a hole in a card is sensed, including keys and analyzing fingers operated by said keys for sensing a hole in a card by passage therethrough, and marking means independent of the sensing means and operable to mark the edge of the card and simultaneously cause a movement of the escapement mechanism.

3. In a verifying machine including an escapement mechanism and a card carrier whose movements are controlled by said mechanism, analyzing keys, means actuated by said keys to sense, by passage therethrough, perforations in a card, and simultaneously operate the escapement mechanism when a hole is sensed, marking means independent of the sensing means operable to cause a movement of the escapement mechanism independent of the analyzing means, said marking means comprising a manually-operated key provided with a punch arranged, when the key is depressed, to place an error-denoting mark on the card.

4. In a verifying machine including an escapement mechanism and a card carrier whose movement is controlled with a step-by-step movement by said mechanism, sensing means arranged to sense by passage therethrough, perforations in a card to permit operation of the escapement mechanism only upon verification of said perforations, marking means independent of the sensing means, and means operated only by the marking means to cause an onward movement of the card carrier when the sensing means fails to sense the hole.

5. In a verifying machine including an escapement mechanism and a card carrier whose movement is controlled with a step-by-step movement by said mechanism, sensing means arranged to sense, by passage therethrough, perforations in a card to permit operation of the escapement mechanism only upon verification of said perforations, a detector key having a stem provided with a punch adapted when the key is depressed to notch the edge of the card, means actuated upon the depression of said key to operate the escapement simultaneously with the punch when the sensing means fails to sense a hole in the card.

6. In a verifying machine including an escapement mechanism and a card carrier whose movement is controlled by said mechanism, sensing means to permit operation of the escapement mechanism only upon verification of a hole in the card, marking means comprising a key having a stem formed to punch a notch in the edge of the card upon the depression of said key, a lever fulcrumed at its forward end and actuated by the key, means actuated by said lever to cause an operation of the escapement mechanism when said key is depressed, and only when the sensing means detects an error.

7. In a verifying machine of the character described including an escapement mechanism and a card carrier whose movement is controlled by said mechanism, sensing means operable to sense a hole in a previously correctly punched card and cause a movement of the card carrier by operation of the escapement mechanism only upon verification of a hole, and also to indicate an error in the punching of said card by failure to sense a hole, and prevent such movement, marking means including a finger formed with a portion so shaped and so positioned relative to the card carrier as to form, when operated, an open end recess in the card, manually operable means available for actuating the marking means, and means operable by said manually operable means to simultaneously actuate the escapement and the recess-forming portion of the marking means.

8. In a verifying machine of the character described, a record support, sensing means operable primarily to sense a hole in a previously correctly punched record and also to indicate an error by failure to sense a hole, ink marking means, means for operating said marking means, the marking means being arranged to place at the edge of the record a mark of a color contrasting with said record, said marking means including a pivoted lever having an inking device on one end and means at the other arranged to be engaged by the marker operating means to rock the lever to operative position, there being means for normally holding the pivoted lever in inoperative position.

OLUF L. CLEVEN.